United States Patent Office 3,082,208
Patented Mar. 19, 1963

3,082,208
10-[(1-PIPERIDYL)LOWER-ALKYL]-LOWER-ALKANOYLPHENOTHIAZINES
Bernard L. Zenitz, Colonie, and Lewis P. Albro, North Greenbush, N.Y., assignors to Sterling Drug Inc., New York, N.Y., a corporation of Delaware
No Drawing. Filed July 7, 1958, Ser. No. 746,616
6 Claims. (Cl. 260—243)

This invention relates to new lower alkanoyl phenothiazinylalkyl amines and to methods for the preparation thereof.

10-[(1-piperidyl)-lower-alkylene]phenothiazines unsubstituted in the piperidene ring are known. The invention resides in the concept of such known types of phenothiazines wherein the phenothiazine nucleus is substituted by a lower-alkanoyl radical and the piperidine ring is substituted by a hydroxy or hydroxy-lower-alkyl radical, or by said radicals when esterified, and salts thereof, whereby new and useful compounds are obtained. The piperidine ring can be further substituted by one or more lower-alkyl radicals. The lower-alkyl radicals can contain from one to about four carbon atoms and can be on the same or on different carbon atoms of the piperidine ring. In the compounds of this invention the lower-alkyanoyl-phenothiazines can be subsequently converted to the corresponding 1,1-(ethylenedioxy) compound.

A preferred aspect of the invention relates to compounds having the formula

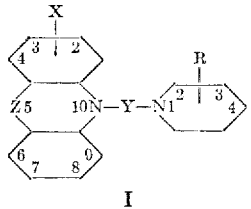

I wherein X represents a lower-alkanoyl or 1,1-(ethylenedioxy)-lower-alkyl radical, Y represents a lower-alkylene radical, Z represents a sulfur atom, the sulfoxide group or the sulfone group and R represents a hydroxy, acyloxy, hydroxy-lower-alkyl or acyloxy-lower-alkyl radical.

When X represents lower-alkanoyl, it can contain from one to about five carbon atoms and can be either straight or branched. Thus X includes, inter alia, such groups as acetyl, butyryl, isobutyryl, 1,1-(ethylenedioxy)ethyl and 1,1-(ethylenedioxy)propyl. The lower-alkanoyl or 1,1-(ethylenedioxy)-lower-alkyl radicals can be in any of the four available positions in the benzene ring, although the 2- and 4-positions are the preferred ones.

In the above general formula I, the alkylene bridge Y has from two to about five carbon atoms, can be straight or branched, and is such that the nitrogen atoms of the phenothiazine and piperidine moieties are separated by at least two carbon atoms. Thus Y includes such groups as ethylene, $CH_2CH_2$; propylene, $CH_2CH_2CH_2$; 1-methylethylene, $CH(CH_3)CH_2$; 2-methylethylene, $$CH_2CH(CH_3)$$

butylene, $CH_2CH_2CH_2CH_2$; 1-methylpropylene, $$CH(CH_3)CH_2CH_2$$

pentylene, $CH_2CH_2CH_2CH_2CH_2$; and the like. A particularly preferred group of compounds is that in which Y is propylene, $CH_2CH_2CH_2$.

In the above Formula I, the group R represents a hydroxy, acyloxy, hydroxy-lower-alkyl or acyloxy-lower-alkyl radical. The hydroxy and acyloxy radicals can be in the 3- or 4-position of the piperidine ring, and the hydroxy-lower-alkyl and acyloxy-lower alkyl radicals can be in the 2-, 3- or 4-position of the piperidine ring, i.e., in any of the three possible positions. A particularly preferred group of compounds is that in which R is in the 4-position of the piperidine ring. The acyloxy radical is one derived from a hydrocarbon carboxylic acid, preferably having from one to about ten carbon atoms, and thus includes such radicals as formyloxy, acetoxy, propionyloxy, butyryloxy, isobutyryloxy, caproyloxy, benzoyloxy, p-toluyloxy, cinnamoyloxy, trimethoxybenzoyloxy, cyclohexenoyloxy, acryloyloxy and the like.

When R represents a hydroxy-lower-alkyl or acyloxy-lower-alkyl radical, it stands for a lower-alkyl radical which can be straight or branched and contains from one to about five carbon atoms, and bears a hydroxy or acyloxy radical attached to a carbon atom in any available position in the side chain respective to the piperidine ring. The acyloxy portions of the acyloxy-lower-alkyl radicals are of the same type as those described above. Thus R includes such radicals as hydroxymethyl, acetoxymethyl, 1-hydroxyethyl, 2-hydroxyethyl, 2-propionyloxyethyl, 3-hydroxypropyl, 5-hydroxypentyl, and the like.

The compounds of the invention are prepared by reacting a lower-alkanoylphenothiazine with a hydroxypiperidine, hydroxy-lower-alkyl-piperidine or ester thereof in which either the penothiazine or the piperidine moiety bears attached to nitrogen a halo-lower-alkyl radical. A preferred method comprises heating a hydroxypiperidine or hydroxy-lower-alkyl-piperidine with a 10-(halo-lower-alkyl)-(1,1-ethylenedioxy)-lower-alkylphenothiazine at a temperature between about 50° C. and 150° C. in the presence of an acid-acceptor. The reaction is preferably carried out in an organic solvent, inert under the conditions of the reaction, such as anhydrous ethanol, benzene, xylene, and the like. The purpose of the acid-acceptor is to take up the hydrogen halide which is split out during the course of the reaction. The acid-acceptor is a basic substance which forms water-soluble by-products easily separable from the main product of the reaction, and includes such substances as alkali metal salts of weak acids, e.g., sodium carbonate, potassium carbonate, sodium acetate, sodium alkoxides, sodium amide, and the like. The acid-acceptor can also be in the form of an excess quantity of hydroxypiperidine or hydroxy-lower-alkylpiperidine. In isolating the product, the 1,1-(ethylenedioxy)-lower-alkyl radical is usually hydrolyzed to the lower-alkanoyl radical. The ketal can be reformed from the lower-alkanoyl-phenothiazine, however, by refluxing a solution of the lower-alkanoylphenothiazine with an excess of ethylene glycol and a small amount of an acid catalyst in an appropriate organic solvent while collecting the water produced in the reaction in a water separator. A preferred acid catalyst is toluenesulfonic acid, and a preferred solvent is benzene.

The reaction of a 10-(halo-lower-alkyl)-(1,1-ethylenedioxy)-lower-alkylphenothiazine with a hydroxypiperidine or hydroxy-lower-alkylpiperidine takes place under relatively mild conditions, a preferred, specific method comprising heating the reactants in boiling ethanol solution in the presence of anhydrous sodium carbonate. The reaction of a [1,1-(ethylenedioxy)-lower-alkyl]phenothiazine with an N-(halo-lower-alkyl)-hydroxypiperidine or -hydroxy-lower-alkylpiperidine requires somewhat more vigorous conditions, a preferred method comprising heating the reactants in boiling xylene in the presence of sodium amide.

The compounds of Formula I wherein R represents an acyloxy or acyloxy-lower-alkyl radical are preferably produced by esterification of the corresponding compounds wherein R represents a hydroxy or hydroxy-lower-alkyl radical, for instance, by heating the hydroxy compound with the appropriate acid anhydride or acid halide in pyridine solution. It is possible, however, to prepare the acyloxy compounds directly by condensation of a 10-(halo-lower-alkyl)-(1,1-ethylenedioxy)-lower-alkylphenothiazine with an acyloxypiperidine or acyloxy-lower-alkylpiperidine, although it is preferable to use an excess of the piperidine reactant as the acid-acceptor rather than sodium carbonate or the like in order to avoid partial cleavage of the ester linkage.

The compounds of Formula I wherein Z is SO or $SO_2$ can be prepared by reacting a 10-(halo-lower-alkyl)-(1,1-ethylenedioxy)-lower-alkylphenothiazine-5-oxide or 10-(halo-lower-alkyl)-(1,1-ethylenedioxy)-lower-alkylphenothiazine-5,5-dioxide, respectively, with a hydroxypiperidine or hydroxy-lower-alkylpiperidine (or esters thereof). Alternatively, the compounds of Formula I wherein Z is SO or $SO_2$ and X is lower-alkanoyl may be prepared by reacting a 10-(halo-lower-alkyl)-lower-alkanoylphenothiazine-5-oxide or 10-(halo-lower-alkyl)-lower-alkanoylphenothiazine-5,5-dioxide, respectively, with a hydroxypiperidine or hydroxy-lower-alkylpiperidine (or esters thereof). The intermediate 10-(halo-lower-alkyl)-(1,1-ethylenedioxy)-lower-alkylphenothiazine-5-oxides and 10-(halo-lower-alkyl)-(1,1-ethylenedioxy)-lower-alkylphenothiazine-5,5-dioxides can be prepared by oxidizing the parent 10-(halo-lower-alkyl)-(lower-alkanoyl)phenothiazines with one or with two molar equivalents of hydrogen peroxide, respectively, in an appropriate organic solvent and preparing the ketal in a subsequent step in the same manner as described above. In preparing the 5-oxide, it is preferred that the reaction be carried out at low temperatures in the range of 0–25° C. in ethanol whereas preparation of the 5,5-dioxide is preferably conducted at more elevated temperatures in the range 50°–115° C. in glacial acetic acid.

Alternatively, the compounds of Formula I wherein Z represents SO or $SO_2$ may be prepared directly from the compounds of Formula I wherein Z represents S by oxidation with hydrogen peroxide as before. In this latter procedure, further oxidation of the piperidyl nitrogen atom to the N-oxide may occur, and in such cases it is necessary to reduce the N-oxide group back to the tertiary amine with an appropriate reducing agent as, for example, sodium bisulfite. Furthermore, it is preferred to carry out the oxidation on the lower alkanoylphenothiazine derivative and if desired to prepare the ketal from the 5-oxide or 5,5-dioxide produced.

The intermediate 10-(halo-lower-alkyl)-(1,1-ethylenedioxy)-lower-alkylphenothiazines can be prepared by reacting the 10-lithio derivative of a (1,1-ethylenedioxy)-lower-alkylphenothiazine with the appropriate halo-lower-alkyl p-toluene-sulfonate. The lower-alkanoylphenothiazines from which the (1,1-ethylenedioxy)-lower-alkylphenothiazines are prepared are in turn prepared by known methods, e.g., see Charpentier et al., Compt. rend. 235, 59–60 (1952), Evans et al., J. Chem. Soc. 1935, 1263–4 (1935), and Massie, Chem. Rev. 54, 797 (1954).

The acid-addition or quaternary ammonium salts of the compounds of Formula I are water-soluble and are the form in which the compounds are conveniently prepared for use physiologically. Pharmacologically acceptable salts are salts whose anions are innocuous to the animal organism in effective doses of the salts, so that beneficial physiological properties inherent in the free bases are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of esters of inorganic acids or organic sulfonic acids having a molecular weight less than about 200 to the free base form of the compounds. Preferred esters are those derived from lower-alkyl, alkenyl or aralkyl esters of inorganic acids or organic sulfonic acids. The alkyl, alkenyl or aralkyl esters so used include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl ester in an organic solvent. Heating can be used to facilitate the reaction, although salt formation usually takes place readily at room temperature. The quaternary ammonium salt separates directly or can be obtained by concentration of the solution.

Although pharmacologically acceptable salts are preferred, those having toxic anions are also useful. All acid-addition salts are useful as intermediates in purification of the free bases, and toxic acid-addition and quaternary ammonium salts are also useful as intermediates in preparing pharmacologically acceptable salts by ion exchange procedures.

The structures of the compounds of the invention have been established by chemical analysis and by the processes for their preparation, which can only lead to compounds of the assigned structures.

The following examples will further illustrate the invention, without the latter being limited thereto.

PREPARATION OF INTERMEDIATES

*Example 1*

*10-(2-chloroethyl)-2-[1,1-(ethylenedioxy)ethyl]phenothiazine.*—A solution of 34.8 g. (0.255 mole) of n-butyl bromide in 50 ml. of absolute ether was added dropwise over a forty-five minute period to a mixture of 3.61 g. of lithium wire in 300 ml. of absolute ether under nitrogen while maintaining the temperature around −10° C. The mixture was stirred an additional thirty minutes and the temperature was lowered to −20° C. 2-(1,1-ethylenedioxy)ethylphenothiazine (64.9 g., 0.228 mole) was then added in portions over a two minute period and the mixture was stirred under nitrogen for forty minutes while maintaining the temperature around 0° C. The temperature was then lowered to −10° C., and 62.9 g. (0.268 mole) of 2-chloroethyl p-toluenesulfonate in 50 ml. of absolute ether was added over a period of about one hour. The mixture was stirred one hour at 0° C. and then for three hours at room temperature. About 100 ml. of water was added slowly with stirring and the two layers were separated. The ether layer was washed several times with water and dried over potassium carbonate. The ether was distilled off and the residual gum dissolved in 200 ml. of benzene and 400 ml. of hexane. The solution was then passed through an alumina column and the product eluted with five liters of 33% benzene in hexane. Removal of the solvent gave a yellow oil which was taken into hexane and crystallized to give 42.5 g. of 10-(2-chloroethyl)-2 - [1,1 - (ethylenedioxy)ethyl]phenothiazine, M.P. 77.4–81.0° C. (corr.).

*Anal.*—Calcd. for $C_{18}H_{18}ClNO_2S$: C, 62.16; H, 5.22; Cl, 10.19. Found: C, 61.90; H, 4.96; Cl, 10.18.

Example 2

*10-(3-chloropropyl)-2-[1,1 - (ethylenedioxy)ethyl]phenothiazine* was prepared from 26 g. (0.19 mole) of n-butyl bromide, 2.7 g. (0.38 mole) of lithium wire, 48.5 g. (0.17 mole) of 2-(1,1-ethylenedioxy)ethylphenothiazine and 49.7 g. (0.20 mole) of 3-chloropropyl p-toluenesulfonate according to the manipulative procedure described above in Example 1. Chromatography on alumina and elution with three liters of 50% benzene in hexane afforded the crude product. The crude material was recrystallized from hexane giving 45.3 g. of 10-(3-chloropropyl)-2-[1,1-(ethylenedioxy)ethyl]phenothiazine, M.P. 87.6–89.6° C. (corr.).

*Anal.*—Calcd. for $C_{19}H_{20}ClNO_2S$: C, 63.05; H, 5.57; S, 8.86. Found: C, 62.92; H, 5.46; S, 8.95.

PREPARATION OF FINAL PRODUCTS

Example 3

*2-acetyl-10-[2-(4-hydroxy-1-piperidyl)ethyl]phenothiazine* [I; X is 2—$CH_3CO$, Y is $(CH_2)_2$, Z is S, R is 4—OH].—A mixture of 6.97 g. (0.02 mole) of 10-(2-chloroethyl)-2-[1,1-(ethylenedioxy)ethyl]phenothiazine, 2.22 g. (0.022 mole) of 4-hydroxypiperidine, 8.3 g. (0.06 mole) of anhydrous potassium carbonate and 100 ml. of n-butanol was heated under reflux for twenty-three hours. The liquid phase was filtered from the insoluble inorganic material and the solvent removed in vacuo. The residue was taken into benzene and extracted four times with water and then three times with 3% aqueous ethane sulfonic acid. The acid extracts were allowed to stand for twenty-four hours to complete the hydrolysis of the ketal. The aqueous solution was basified with dilute ammonium hydroxide and extracted with methylene dichloride. The extracts were dried and the solvent removed. On treatment with hot hexane, the crude product crystallized. It was collected and recrystallized once from an ethyl acetate-hexane mixture and once from ethyl acetate giving 4.25 g. of 2-acetyl-10-[2-(4-hydroxy-1-piperidyl)ethyl]phenothiazine, M.P. 135.4–138.8° C. (corr.).

*Anal.*—Calcd. for $C_{21}H_{24}N_2O_2S$: C, 68.44; H, 6.56; S, 8.70. Found: C, 68.71; H, 6.38; S, 8.40.

2-acetyl-10-[2-(4-hydroxy-1-piperidyl)ethyl]phenothiazine can be reacted with hydrobromic acid, hydriodic acid, sulfuric acid, phosphoric acid, acetic acid, citric acid, tartaric acid, quinic acid, methyl iodide, methyl bromide, ethyl bromide, allyl bromide, benzyl chloride, 2-chlorobenzyl chloride, or methyl p-toluenesulfonate to give the hydrobromide, hydriodide, sulfate (or bisulfate), phosphate (or acid phosphate), acetate, citrate (or acid citrate), tartrate (or bitartrate), quinate, methiodide, methobromide, ethobromide, allobromide, benzochloride, 2-chlorobenzochloride, or metho-p-toluenesulfonate salts, respectively.

Example 4

*2-acetyl-10-[2-(4-hydroxymethyl-1-piperidyl)ethyl]phenothiazine.*—[I; X is 2—$CH_3CO$, Y is $(CH_2)_2$, Z is S, R is 4—$CH_2OH$] was prepared from 6.97 g. (0.02 mole) of 10-(2-chloroethyl)-2 - (1,1-ethylenedioxy)ethylphenothiazine, 2.53 g. (0.022 mole) of 4-hydroxymethylpiperidine and 8.3 g. (0.06 mole) of anhydrous potassium carbonate in 100 ml. of n-butanol according to the manipulative procedure described above in Example 3. The product was isolated as the free base and recrystallized from ethyl acetate giving 5.0 g. of 2-acetyl-10-[2-(4-hydroxymethyl - 1 - piperidyl)ether]phenothiazine, M.P. 128.0–130.6° C. (corr.).

*Anal.*—Calcd. for $C_{22}H_{26}N_2O_2S$: C, 69.08; H, 6.85; S, 8.38. Found: C, 68.86; H, 6.82; S, 8.47.

Example 5

*2-acetyl-10-[3-(4-hydroxy - 1 - piperidyl)propyl]phenothiazine* [I; X is 2—$CH_3CO$, Y is $(CH_2)_3$, Z is S, R is 4—OH] was prepared from 9.53 g. (0.03 mole) of 10-(3-chloropropyl)-2-acetylphenothiazine, 3.03 g. (0.03 mole) of 4-hydroxypiperidine and 7.7 g. (0.06 mole) of anhydrous potassium carbonate in 150 ml. of n-butanol according to the manipulative procedure described above in Example 3. The product was isolated as the free base and recrystallized from an ethyl acetate-pentane mixture giving 2.92 g. of 2-acetyl-10-[3-(4-hydroxy-1-piperidyl)-propyl]phenothiazine, M.P. 101.4–105.8° C. (corr.).

*Anal.*—Calcd. for $C_{22}H_{26}N_2O_2S$: C, 69.08; H, 6.85; N, 7.33. Found: C, 69.71; H, 6.70; N, 7.16.

Example 6

*2 - acetyl - 10 - [3 - (4 - hydroxymethyl - 1 - piperidyl)-propyl]phenothiazine* [I; X is 2—$CH_3CO$, Y is $(CH_2)_3$, Z is S, R is 4—$CH_2OH$] was prepared from 7.2 g. (0.02 mole) of 10-(3-chloropropyl)-2-(1,1-ethylenedioxy)ethylphenothiazine, 2.5 g. (0.022 mole) of 4-hydroxymethylpiperidine and 5.5 g. (0.04 mole) of anhydrous potassium carbonate in 200 ml. of n-butanol according to the manipulative procedure described above in Example 3. The product was isolated as the free base and recrystallized from a benzene-hexane mixture giving 6.6 g. of 2 - acetyl - 10 - [3 - (4 - hydroxymethyl - 1 - piperidyl)-propyl]phenothiazine, M.P. 117.0–120.0° C. (corr.).

*Anal.*—Calcd. for $C_{23}H_{28}N_2O_2S$: C, 69.67; H, 7.12; S, 8.09. Found: C, 69.89; H, 7.03; C, 8.30.

Example 7

*2 - acetyl - 10 - {3 - [4 - (2 - hydroxyethyl) - 1 - piperidyl]propyl}phenothiazine* [I; X is 2—$CH_3CO$, Y is $(CH_2)_3$, Z is S, R is 4—$CH_2CH_2OH$] was prepared from 7.2 g. (0.02 mole) of 10-(3-chloropropyl)-2-(1,1-ethylenedioxy)ethylphenothiazine, 3.6 g. (0.022 mole) of 4-(2-hydroxyethyl)piperidine hydrochloride and 8.2 g. (0.06 mole) of anhydrous potassium carbonate in 150 ml. of n-butanol according to the manipulative procedure described above in Example 3. The product was isolated as the free base and recrystallized from an ethyl acetate-hexane mixture giving 3.3 g. of 2-acetyl-10-{3-[4 - (2 - hydroxyethyl) - 1 - piperidyl]propyl}phenothiazine, M.P. 105.2–107.6° C. (corr.).

*Anal.*—Calcd. for $C_{24}H_{30}N_2O_2S$: C, 70.20; H, 7.36; S, 7.81. Found: C, 70.46; H, 7.16; S, 8.05.

Example 8

*2 - acetyl - 10 - {3 - [4 - (3 - hydroxypropyl) - 1 - piperidyl]propyl}phenothiazine* [I; X is 2—$CH_3CO$, Y is $(CH_2)_3$, Z is S, R is 4—$(CH_2)_3OH$] was prepared from 7.2 g. (0.02 mole) of 10-(-chloropropyl)-2-(1,1-ethylenedioxy)ethylphenothiazine, 4.4 g. (0.022 mole) of 4-(3-hydroxypropyl)piperidine acetate and 8.2 g. (0.06 mole) of anhydrous potassium carbonate according to the manipulative procedure described above in Example 3. The product was isolated as the free base and recrystallized from a benzene-hexane mixture giving 5.4 g. of 2 - acetyl - 10 - {3 - [4 - (3 - hydroxypropyl) - 1-piperidyl]propyl}phenothiazine, M.P. 77.6–80.6° C. (corr.).

*Anal.*—Calcd. for $C_{25}H_{32}N_2O_2S$: C, 70.71; H, 7.60; S, 7.55. Found: C, 70.94; H, 7.86; S, 7.70.

Example 9

*2 - acetyl - 10 - {3 - [4 - (2 - hydroxyethyl) - 1 - piperidyl]propyl}phenothiazine-5-oxide* [I; X is 2—$CH_3CO$, Y is $(CH_2)_3$, Z is SO, R is 4—$CH_2CH_2OH$].—By following the manipulative procedure described above in Example 7 and by replacement of the 10-(3-chloropropyl) - 2 - (1,1 - ethylenedioxy)ethylphenothiazine used therein by a molar equivalent amount of 2-acetyl-10 - (3 - chloropropyl)phenothiazine - 5 - oxide (prepared from 2-acetyl-10-(3-chloropropyl)phenothiazine by oxidation, with one molar equivalent of hydrogen peroxide in ethanol), there can be obtained 2-acetyl-10 - {3 - [4 - hydroxyethyl) - 1 - piperidyl]propyl}phenothiazine-5-oxide.

Example 10

2 - acetyl - 10 - {3 - [4 - (2 - hydroxyethyl) - 1 - piperidyl]propyl}phenothiazine - 5,5 - dioxide [I; X is 2—CH$_3$CO, Y is (CH$_2$)$_3$, Z is SO$_2$, R is

4—CH$_2$CH$_2$OH]

By following the manipulative procedure described above in Example 7, and by replacement of the 10-(3-chloropropyl) - 2 - (1,1 - ethylenedioxy)ethylphenothiazine used therein by a molar equivalent amount of 2-acetyl-10-(3-chloropropyl)phenothiazine-5,5-dioxide (prepared from 2-acetyl-10-(3-chloropropyl)phenothiazine by oxidation with two molar equivalents of hydrogen peroxide in glacial acetic acid), there can be obtained 2-acetyl-10 - {3 - [4 - (2 - hydroylethyl) - 1 - piperidyl]propyl}phenothiazine-5,5-dioxide.

Example 11

2 - acetyl - 10 - {3 - [4 - (2 - hydroxyethyl) - 2 - methyl-1-piperidyl]propyl}phenothiazine [I; X is 2—CH$_3$CO, Y is (CH$_2$)$_3$, Z is C, R is 4—CH$_2$CH$_2$OH—2—CH$_3$].— By following the manipulative procedure described above in Example 7 and by replacement of the 4-(2-hydroxyethyl)piperidine used therein by a molar equivalent amount of 4-(2-hydroxyethyl)-2-methylpiperidine, there can be obtained 2-acetyl-10-{3-[4-(2-hydroxyethyl)-2-methyl-1-piperidyl]propyl}phenothiazine.

Example 12

2 - acetyl - 10 - {3 - [2,5 - dimethyl - 4 - (2 - hydroxyethyl) - 1 - piperidyl]propyl}phenothiazine [I; X is 2—CH$_3$CO, Y is (CH$_2$)$_3$, Z is S, R is 4—CH$_2$CH$_2$OH—2,5—di—CH]

By following the manipulative procedure described above in Example 7 and by replacement of the 4-(2-hydroxyethyl)piperidine used therein by a molar equivalent amount of 2,5-dimethyl-4-(2-hydroxyethyl)piperidine, there can be obtained 2-acetyl-10-{3-[2,5-dimethyl-4-(2-hydroxyethyl)-1-piperdyl]propyl}phenothiazine.

Example 13

2 - acetyl - 10 - {3 - [2,2 - dimethyl - 4 - (2 - hydroxyethyl) - 1 - piperidyl]propyl}phenothiazine [I; X is 2-CH$_2$CO, Y is (CH$_2$)$_3$, Z is S, R is 4—CH$_2$CH$_2$OH—2,2—di—CH$_3$]

By following the manipulative procedure described above in Example 7 and by replacement of the 4-(2-hydroxyethyl)piperidine used therein by a molar equivalent amount of 2,2-dimethyl-4-(2-hydroxyethyl)piperidine, there can be obtained 2-acetyl-10-{3-[2,2-dimethyl-4-(2-hydroxyethyl)-1-piperidyl]propyl}phenothiazine.

Example 14

2 - acetyl - 10 - {3 - [4 - (2 - acetoxyethyl) - 1 - piperidyl]propyl}phenothiazine [I; X is 2—CH$_3$CO, Y is (CH$_2$)$_3$, Z is S, R is 4—CH$_2$CH$_2$OCOCH$_3$].—By refluxing a solution of 2-acetyl-10-{3-[4-(2-hydroxyethyl)-1-piperidyl]propyl}phenothiazine, acetic anhydride and pyridine, removing the solvent in vacuo, basifying the residue with ammonium hydroxide and isolating the product according to the manipulative procedure described above in Example 3, there can be obtained 2 - acetyl - 10 - {3 - [4 - (2 - acetoxyethyl) - 1 - piperidyl]propyl}phenothiazine.

Example 15

2-acetyl-10-{3-[4-(2 - formyloxyethyl)-1-piperidyl]propyl}phenothiazine [I; X is 2—CH$_3$CO, Y is (CH$_2$)$_3$, Z is S, R is 4—CH$_2$CH$_2$OCOH].—By following the manipulative procedure described above in Example 14 omitting the pyridine used therein and adding formic acid to the reaction mixture, there can be obtained 2-acetyl-10-{3-[4-(2-formyloxyethyl)-1-piperidyl]-propyl}phenothiazine.

Example 16

2 - acetyl - 10-{3-[4-(2 - benzoyloxyethyl)-1-piperidyl]propyl}phenothiazine [I; X is 2—CH$_3$CO, Y is (CH$_2$)$_3$, Z is S, R is 4—CH$_2$CH$_2$OCOC$_6$H$_5$].—By following the manipulative procedure described above in Example 14 and by replacement of the acetic anhydride used therein by a molar equivalent amount of benzoyl chloride, there can be obtained 2-acetyl-10-{3-[4-(2-benzoyloxyethyl)-1-piperidyl]propyl}phenothiazine.

Example 17

2-acetyl-10-{3-[4-(2 - cinnamoyloxyethyl)-1-piperidyl]propyl}phenothiazine [I; X is 2—CH$_3$CO, Y is (CH$_2$)$_3$, Z is S, R is 4—CH$_2$CH$_2$OCOCH=CHC$_6$H$_5$].—By following the manipulative procedure described above in Example 14 and by replacement of the acetic anhydride by a molar equivalent amount of cinnamoyl chloride, there can be obtained 2-acetyl-10-{3-[4-(2-cinnamoyloxyethyl)-1-piperidyl]propyl}phenothiazine.

Example 18

2-acetyl-10-{3-[4-(2 - cyclohexenoyloxyethyl)-1-piperidyl]propyl}phenothiazine [I; X is 2-CH$_3$CO, Y is (CH$_2$)$_3$, Z is S, R is 4—CH$_2$CH$_2$OCOC$_6$H$_9$].—By following the manipulative procedure described above in Example 14 and by replacement of the acetic anhydride used therein by a molar equivalent amount of cyclohexenoyl chloride, there can be obtained 2-acetyl-10-{3-[4-(2-cyclohexenoyloxyethyl)-1-piperidyl]propyl}phenothiazine.

Example 19

2-acetyl-10-{3-[4-(2 - acryloyloxyethyl) - 1 - piperidyl]propyl}phenothiazine [I; X is 2—CH$_3$CO, Y is (CH$_2$)$_3$, Z is S, R is 4—CH$_2$CH$_2$OCOCH=CH$_2$).—By following the manipulative procedure described above in Example 14 and by replacement of the acetic anhydride used therein by a molar equivalent amount of acryloyl chloride, there can be obtained 2-acetyl-10-{3-[4-(2-acryloyloxyethyl)-1-piperidyl]propyl}phenothiazine.

Example 20

2 - acetyl-10-[3-(2 - hydroxymethyl-1-piperidyl)propyl]phenothiazine [I; X is 2—CH$_3$CO, Y is (CH$_2$)$_3$, Z is S, R is 2—CH$_2$OH].—By following the manipulative procedure described above in Example 5 and by replacement of the 4-hydroxypiperidine used therein by a molar equivalent amount of 2-hydroxymethylpiperidine, there can be obtained 2 - acetyl - 10 - [3 - (2 - hydroxymethyl - 1 - piperidyl)propyl]phenothiazine.

Example 21

10-{3-[4-(2 - hydroxyethyl)-1-piperidyl]propyl}-2-propionyl-phenothiazine [I; X is 2—C$_2$H$_5$CO, Y is (CH$_2$)$_3$, Z is S, R is 4—CH$_2$CH$_2$OH].—By following the manipulative procedure described above in Example 7 and by replacement of the 10-(3-chloropropyl)-2-(1,1-ethylenedioxy)ethylphenothiazine by a molar equivalent amount of 10-(3-chloropropyl) - 2 - (1,1-ethylenedioxy)propylphenothiazine (prepared from 2-(1,1-ethylenedioxy)propylphenothiazine and 3-chloropropyl p-toluenesulfonate according to the manipulative procedure described above in Example 1), there can be obtained 10-{3-[4-(2-hydroxyethyl)-1-piperidyl]propyl} - 2 - propionylphenothiazine.

Example 22

4-acetyl - 10 - {3-[4-(2-hydroxyethyl)-1-piperidyl]pro-

*pyl}phenothiazine* [I; X is 4—CH₃CO, Y is (CH₂)₃, Z is S, R is 4—CH₂CH₂OH].—By following the manipulative procedure described above in Example 7 and by replacement of the 10-(3-chloropropyl)-2-(1,1-ethylenedioxy)ethylphenothiazine by a molar equivalent amount of 10-(3-chloropropyl) - 4 - (1,1-ethylenedioxy)ethylphenothiazine (prepared from 4-(1,1-ethylenedioxy)ethylphenothiazine and 3-chloropropyl p-toluenesulfonate according to the manipulative procedure described above in Example 1), there can be obtained 4-acetyl-10-{3-[4-(2-hydroxyethyl)-1-piperidyl]propyl}phenothiazine.

Example 23

*2-(1,1 - ethylenedioxy)ethyl - 10 - {3 - [4 - (2-hydroxyethyl)-1-piperidyl]propyl}phenothiazine* [I; X is

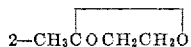

Y is (CH₂)₃, Z is S, R is 4—CH₂CH₂OH].—By refluxing a mixture of 2-acetyl-10-{3-[4-(2-hydroxyethyl)-1-piperidyl]propyl}phenothiazine with about a three molar excess of ethylene glycol and a small amount of p-toluenesulfonic acid in benzene for about twenty-four hours under a Dean-Stark trap, and by removing the lower layer of unreacted glycol from the reaction mixture, washing the benzene layer with dilute aqueous sodium carbonate, drying the benzene layer over calcium carbonate, removing the solvent and recrystallizing the residue from an appropriate solvent, there can be obtained 2-(1,1-ethylenedioxy)ethyl - 10-{3-[4-(2-hydroxyethyl)-1-piperidyl]propyl}phenothiazine.

Example 24

*2-acetyl - 10 - {3-[4-(5-hydroxypentyl)-1-piperidyl]propyl}phenothiazine* [I; X is 2—CH₃CO, Y is (CH₂)₃, Z is S, R is 4—(CH₂)₅OH].—By following the manipulative procedure described above in Example 5 and by replacement of the 4-hydroxypiperidine used therein by a molar equivalent amount of 4-(5-hydroxypentyl)piperidine, there can be obtained 2-acetyl-10-{3-[4-(5-hydroxypentyl)-1-piperidyl]propyl}phenothiazine.

The compounds of the invention possess a variety of depressant actions on the central and autonomic nervous system, the cardiovascular system and the skeletal-muscular system. They lower the blood pressure and antagonize the pressor effects of epinephrine in dogs, they decrease the incidence of vomiting induced by apomorphine in dogs, they lower the rectal temperature in mice, and they potentiate the sleeping time in mice induced by ether, thiopental sodium, or hexobarbital sodium. These activities indicate their usefulness as hypotensive agents, antinauseants, antipyretics, and sedatives. The compounds can be prepared for use by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in tablet or capsule form for oral administration. They are formulated and used in the same way as known compounds having similar activities, such as chlorpromazine. The toxicity of the compounds of the invention is of the same order of magnitude as that of chlorpromazine.

We claim:

1. A member of the group consisting of (A) compounds of the formula

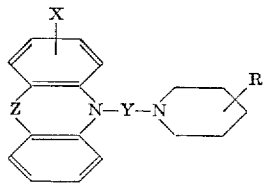

wherein X is a member of the group consisting of lower-alkanoyl containing from one to five carbon atoms and 1,1-(ethylenedioxy)-lower-alkyl containing from one to five carbon atoms in the lower-alkyl group; Y is lower-alkylene containing at least two carbon atoms separating the nitrogen atoms; Z is a member of the group consisting of a sulfur atom, the sulfoxide group, and the sulfone group; and R is a member of the group consisting of hydroxy in other than the 2-position of the piperidine ring and non-acetylenic hydrocarbon carboxylic acyloxy in other than the 2-position of the piperidine ring and containing from one to ten carbon atoms; (B) pharmacologically-acceptable acid-addition salts thereof; and (C) pharmacologically-acceptable lower-alkyl, lower-alkenyl, and monocarbocyclic aryl-lower-alkyl quaternary ammonium salts thereof.

2. A pharmacologically acceptable acid-addition salt of a compound of the formula

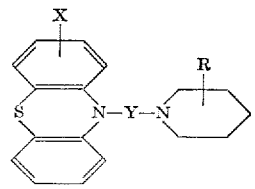

wherein X is lower-alkanoyl containing from one to five carbon atoms, Y is lower-alkylene containing at least two carbon atoms separating the nitrogen atoms, and R is hydroxy in other than the 2-position.

3. A pharmacologically acceptable acid-addition salt of a compound of the formula

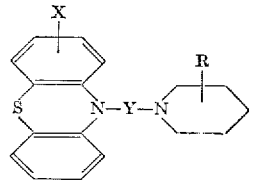

wherein X is lower-alkanoyl containing from one to five carbon atoms, Y is lower-alkylene containing at least two carbon atoms separating the nitrogen atoms, and R is non-acetylenic hydrocarbon carboxylic acyloxy in other than the 2-position of the piperidine ring and containing from one to ten carbon atoms.

4. A pharmacologically acceptable acid-addition salt of 2 - acetyl - 10 - [2 - (4 - hydroxy - 1 - piperidyl)ethyl]-phenothiazine.

5. A pharmacologically acceptable acid-addition salt of 2 - acetyl - 10 - [3 - (4 - hydroxy - piperidyl)propyl]-phenothiazine.

6. A compound of the formula

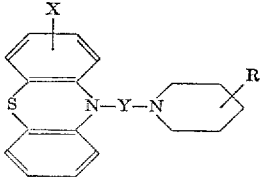

wherein X is 1,1-(ethylenedioxy)-lower-alkyl, said lower-alkyl group containing from one to five carbon atoms, Y is lower-alkylene containing at least two carbon atoms separating the nitrogen atoms, and R is hydroxy in other than the 2-position of the piperidine ring.

References Cited in the file of this patent

UNITED STATES PATENTS

| | | |
|---|---|---|
| 2,512,520 | Cusic | June 20, 1950 |
| 2,534,237 | Cusic | Dec. 19, 1950 |
| 2,676,971 | Cusic | Apr. 27, 1954 |
| 2,766,235 | Cusic | Oct. 6, 1956 |
| 2,898,336 | Gailliot et al. | Aug. 4, 1959 |
| 3,000,885 | Cusic | Sept. 19, 1961 |

(Other references on following page)

FOREIGN PATENTS

| | | |
|---|---|---|
| 808,049 | Great Britain | Jan. 28, 1959 |
| 550,647 | Belgium | December 1956 |

OTHER REFERENCES

Wagner-Zook: Synthetic Org. Chem. (1953), pp. 261–263, John Wiley and Sons, N.Y.

Fieser et al.: "Organic Chemistry," pages 103 and 215, third edition, copyrighted 1956, third printing, 1958, D. C. Heath and Co., Boston, Mass.

Delay: Chem. Abst., vol. 52, page 18899, Nov. 10, 1958, citing Presse med 65, pp. 491–3 (1957).

Schmit: Compte Rendu, 244, pp. 255–258 (January 1957).

Schmitt et al.: Bull. Soc. Chim., France, 1957, pages 1474–1481.

UNITED STATES PATENT OFFICE
CERTIFICATE OF CORRECTION

Patent No. 3,082,208                       March 19, 1963

Bernard L. Zenitz et al.

It is hereby certified that error appears in the above numbered patent requiring correction and that the said Letters Patent should read as corrected below.

Column 1, lines 30 to 39, for that portion of the formula reading

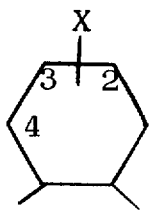 read 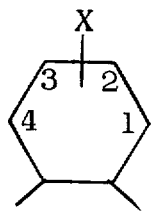

column 6, line 1, for "ether" read -- ethyl --; line 35, for "C, 8.30" read -- S, 8.30 --; line 58, for "10-(-chloropropyl)" read -- 10-(3-chloropropyl) --; column 7, line 8, for "4-hydroxyethyl" read -- 4-(2-hydroxyethyl --; line 24, for "hydroylethyl" read -- hydroxethyl --; line 30, for "Z is C" read -- Z is S --; line 43, for "di-CH]" read -- di-$CH_3$] --; lines 53 and 54, for "X is 2-$CH_2$CO," read -- X is 2-$CH_3$CO, --; column column 8, line 19, for "propyl]phenothiazine" read -- propyl}phenothiazine --; column 10, line 49, for "4-hydroxypiperidyl" read -- 4-hydroxy-1-piperidyl --.

Signed and sealed this 31st day of December 1963.

(SEAL)
Attest:
ERNEST W. SWIDER

Attesting Officer

EDWIN L. REYNOLDS
                                       Acting Commissioner of
                                               Patents